(12) United States Patent
Loughman

(10) Patent No.: US 6,487,810 B1
(45) Date of Patent: Dec. 3, 2002

(54) METHOD AND APPARATUS FOR MANUALLY ACTIVATED TURKEY DECOY

(76) Inventor: Van Loughman, R.D. 1, Box 138, Sycamore, PA (US) 15364

( * ) Notice: Subject to any disclaimer, the term of this patent is extended or adjusted under 35 U.S.C. 154(b) by 0 days.

(21) Appl. No.: 09/915,078

(22) Filed: Jul. 24, 2001

(51) Int. Cl.$^7$ ............................................. A01M 31/06
(52) U.S. Cl. ................................................................ 43/2
(58) Field of Search ........................................ 43/3, 2

(56) References Cited

U.S. PATENT DOCUMENTS

| | | | | |
|---|---|---|---|---|
| 2,663,108 A | * | 12/1953 | Dixon et al. ...................... | 43/3 |
| 2,691,233 A | * | 10/1954 | Richardson ...................... | 43/3 |
| 4,896,448 A | | 1/1990 | Jackson ............................ | 43/3 |
| 4,965,953 A | * | 10/1990 | McKinney ........................ | 43/2 |
| 5,168,649 A | * | 12/1992 | Wright ............................. | 43/2 |
| 5,199,204 A | | 4/1993 | Lowery ............................ | 43/2 |
| 5,289,654 A | | 3/1994 | Deny et al. ...................... | 43/2 |
| 5,515,637 A | * | 5/1996 | Johnson ........................... | 43/2 |
| 5,632,110 A | * | 5/1997 | Roy ................................. | 43/2 |
| D398,697 S | | 9/1998 | Scordo ....................... | D22/125 |
| 5,884,427 A | | 3/1999 | Lenz ................................ | 43/2 |
| 5,974,720 A | | 11/1999 | Bowling .......................... | 43/3 |
| 6,070,356 A | | 6/2000 | Brint et al. ...................... | 43/2 |
| 6,092,322 A | | 7/2000 | Samaras .......................... | 43/2 |
| 6,212,816 B1 | | 4/2001 | Babbitt et al. .................. | 43/3 |

* cited by examiner

Primary Examiner—Charles T. Jordan
Assistant Examiner—Danielle Rosenthal
(74) Attorney, Agent, or Firm—Webb Ziesenheim Logsdon Orkin & Hanson, P.C.

(57) ABSTRACT

A method and apparatus for a manually activated turkey decoy simulating full strut gobbler tail movement. The turkey decoy comprises a tail rod with a pulling arm and attached tail-feathers, the tail rod incorporating a spring mechanism, and the tail rod being rotatably, coaxially, and removably attached to a ground stake. A pull line is attached to the pulling arm. After inserting both the turkey decoy and turkey decoy body into the ground, and thereafter optionally routing the pull line using guide stakes, the pull line may be pulled to cause tail-feather movement. The turkey decoy may also be adapted to move an entire decoy.

18 Claims, 7 Drawing Sheets

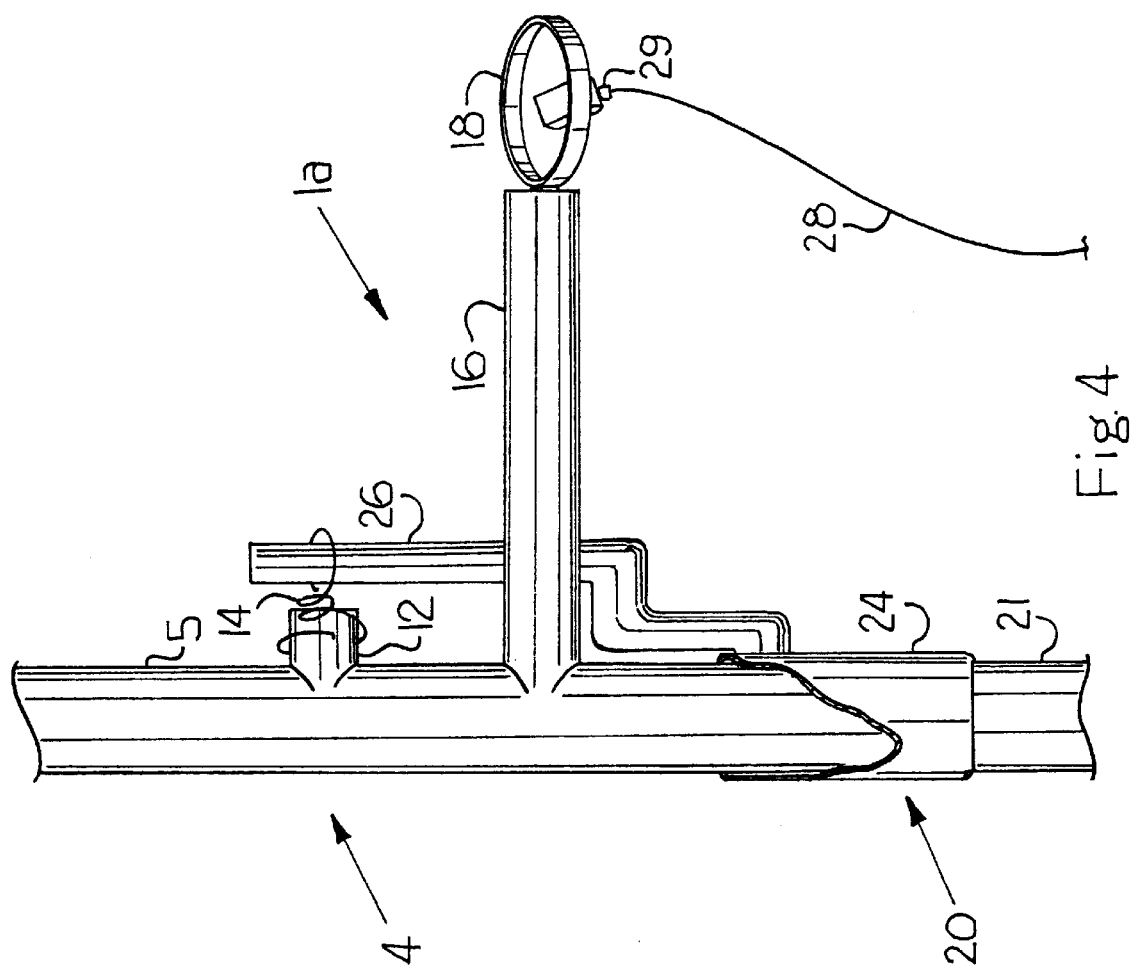
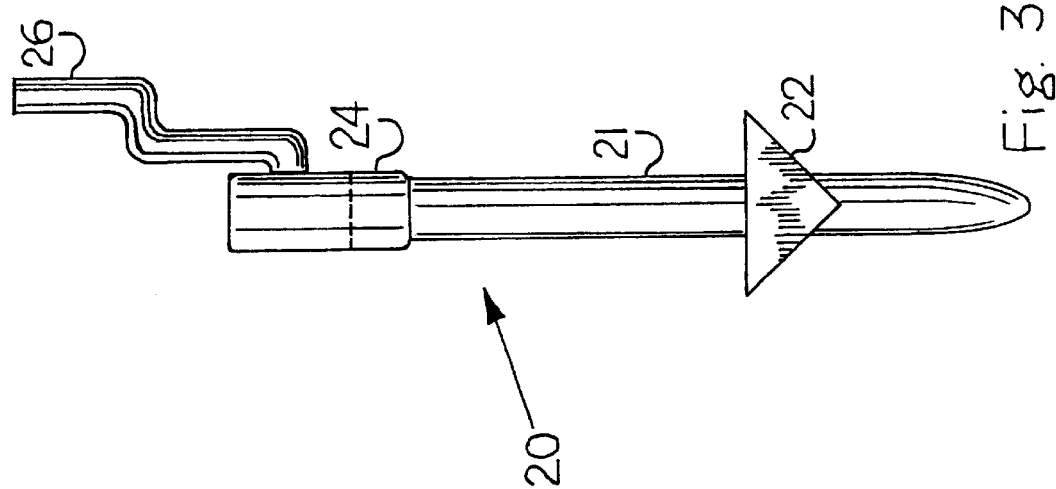

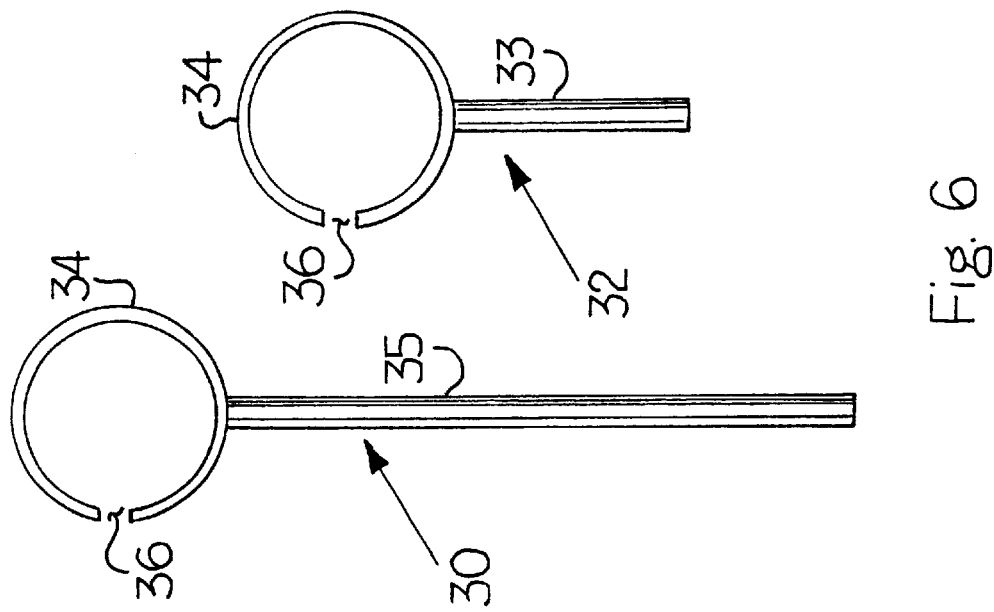
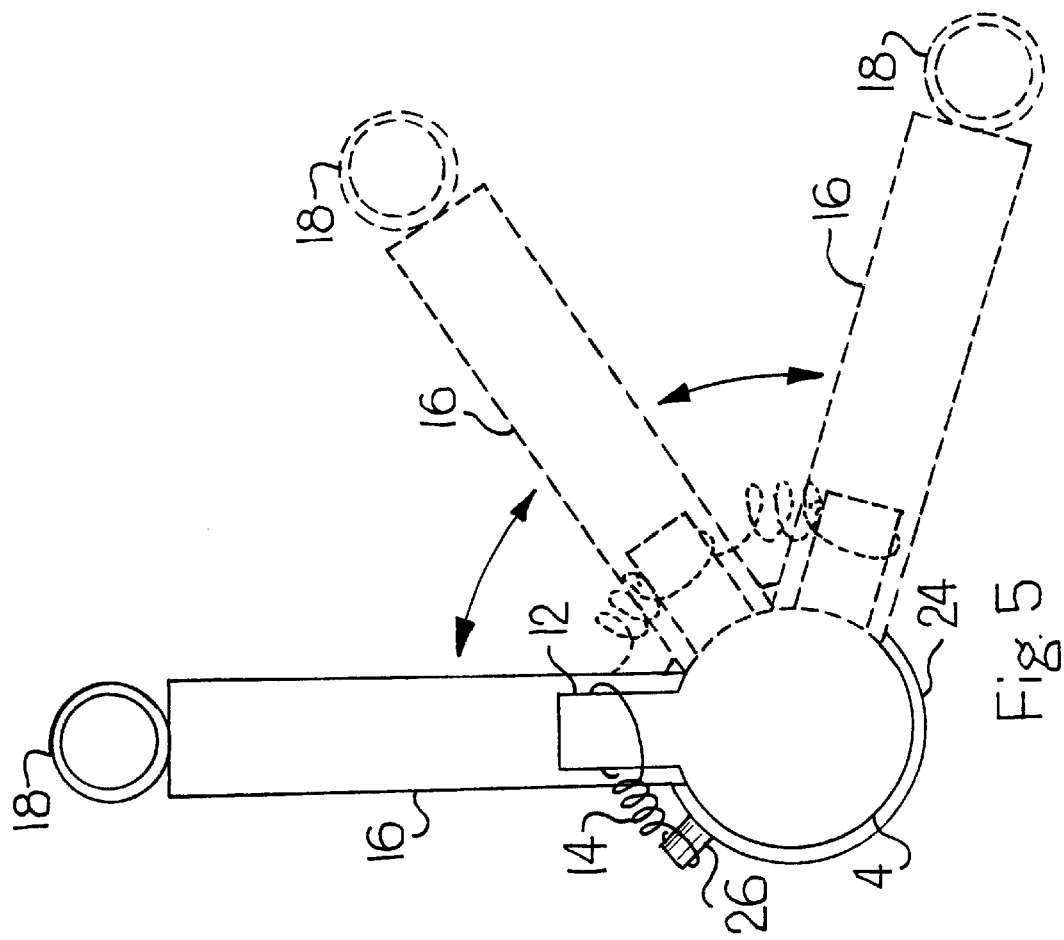
Fig. 6
Fig. 5

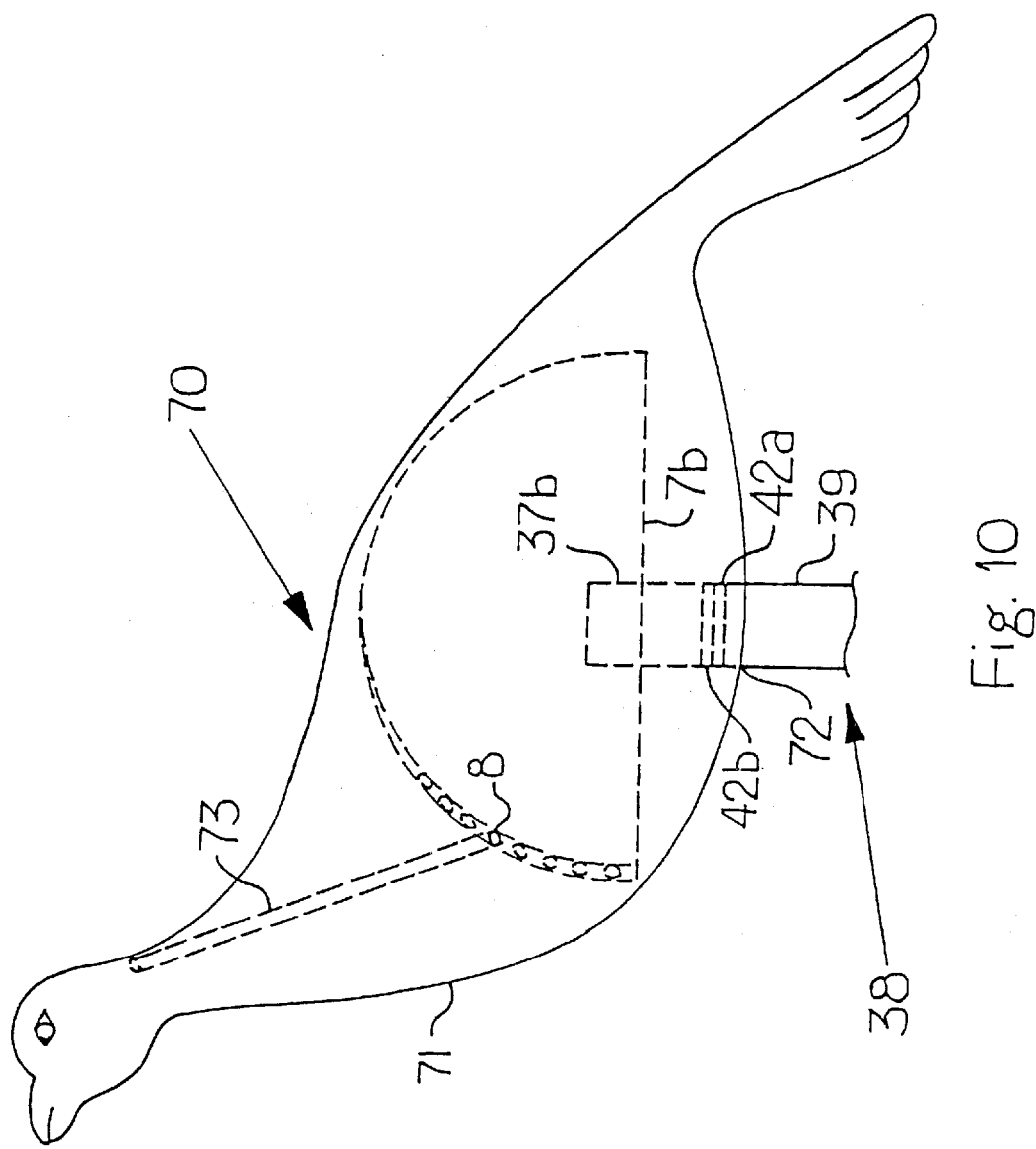
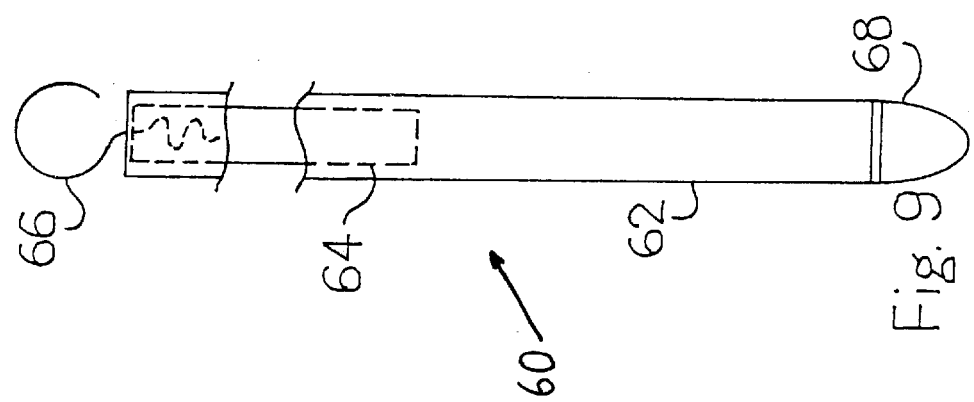

METHOD AND APPARATUS FOR MANUALLY ACTIVATED TURKEY DECOY

BACKGROUND OF THE INVENTION

1. Field of the Invention

The present invention relates to hunting decoys, and more specifically, to movable turkey decoys.

2. Description of the Prior Art

Decoys of great variety in construction and purpose have been used to lure turkeys into range for effective hunting, harvest, and/or observation and study. While decoys often provide a life-like appearance, it has also been desirable for obvious reasons to make the decoy move in a life-like fashion in a manner that is exhibited by the represented animal. Faced with this challenge, practitioners in the art have endeavored on many occasions to so motivate a decoy. Previous attempts to create a realistic and effective decoy include:

Samnara, U.S. Pat. No. 6,092,322, discloses the use of a wind activated animal decoy. Specifically, the use of a turkey decoy with tail-feathers, which upon wind activation, causes the head to move up and down and side-to-side.

Brint, U.S. Pat. No. 6,070,356, discloses the use of a full body turkey decoy, having a tail, which uses a battery-powered electric motor and internal counter weights to simulate strutting turkey behavior. Furthermore, the invention shows a turkey decoy that, upon activation, causes the decoy to rotate intermittently on a support rod and also causes tail vibration.

Lenz, U.S. Pat. No. 5,884,427, discloses a battery-operated animal decoy mechanism having a motor. The motor has at least one projecting member which activates a tail flicking attachment, thus simulating the tail flicking of a live animal.

It is well-known among turkey hunters that during the turkey mating season, male (gobbler) turkeys attempt to find female (hen) turkeys with which to breed. This results in gobblers initiating a mating ritual involving the display of their tail-feathers, while moving them from side-to-side in what is known as a full strut. The gobbler's full strut is-meant to attract the hen to the gobbler for potential mating.

Prior art turkey decoys suffer from various drawbacks, in that imperfect conditions and inherent limitations in the design and surrounding environment generally cause these decoys to exhibit atypical or unrealistic movement which may startle or warn the turkey or may have no effect whatsoever. Prior art decoys designed to move with nature's forces (as disclosed in the '322 patent, for example) lack controllable manual-motion, but more specifically, controllable, isolated tail movement, the essential element in attracting other turkeys. Similarly, the motion exhibited by electronically operated decoys (as disclosed. in the '356 patent, for example) is generally not representative of gobbler mating rituals. Also, motor-driven decoys have an amount of noise inherent in their operation, that results in turkeys being scared away from the decoy and the immediate area. Additionally, unfavorable weather (e.g., rain, dampness, coldness, etc.) may adversely affect electronic components through corrosion and condensation. Furthermore, electronic mechanisms tend to wear down the power source (usually batteries) required for the decoy's movement, relatively quickly. This may result in the decoy failing to operate at critical times during the hunting period. Finally, some states and hunting associations, do not permit the use of electronically controlled decoys.

Due to these drawbacks and limitations, including the lack of fall strut simulation, the aforementioned prior art is generally non-conducive to turkey hunting.

Accordingly, what is needed, and has not heretofore been developed, is a manually activated, realistic turkey decoy apparatus that simulates the key aspect inherent to a gobbler's mating ritual. Field work using the present invention has confirmed that tail-feather movement is critical to the believability of the decoy's authenticity in the minds of hen turkeys that may observe it. Furthermore, within a dominant gobbler's territory, if another gobbler attempts to lure the dominant gobbler's hens by means of a full strut, the dominant gobbler becomes upset and approaches the challenging gobbler to re-establish dominance among the hens. Therefore, a full strut may be used to not only attract hens, but also gobblers. Therefore, it is a principal object of the present invention to provide a decoy apparatus, that through controllable manual motion, produces a natural, isolated tail-feather movement, thereby simulating a gobbler's full strut.

It is another object of the present invention to provide a decoy apparatus which is portable, requires only a minimal number of elements, and requires only a minimal number of steps to utilize. This results in efficiency in set-up and preparation of the decoy, a critical aspect to turkey hunting. Furthermore, the use of guide stakes allow the decoy apparatus to be used over and around varied terrain and obstacles, while also preventing turkeys from tripping over the pull line utilized in the present invention.

It is an additional object of the present invention to provide such a decoy apparatus which utilizes real turkey feathers, as adding detail to the decoy, in order to draw turkeys to an even closer proximity, as compared to the use of artificial feathers.

It is a further object of the present invention to allow the user to maintain a suitable distance from the decoy apparatus, while still achieving fill operability over the invention.

It is another object of the present invention to provide a decoy apparatus which may be adapted to move not only the tail, but an entire decoy body.

It is yet another object of the present invention to provide a scaled-down version of the decoy apparatus, that through its construction design and lighter components, weighs less than the preferred embodiment.

SUMMARY OF THE INVENTION

The present invention provides, in the preferred embodiment, a rod with an affixed pulling arm and attached tail-feathers. A pull line is attached to the pulling arm. The rod is co-axially and rotatably attached to a ground stake. After insertion of the decoy apparatus' ground stake into the ground, a stationary turkey decoy is also inserted into the ground, forward and adjacent to the decoy apparatus. After inserting optional guide stakes into the ground, the user may then pull on the pull line attached to the pulling arm. The pulling arm acts upon a spring mechanism incorporating the rod and ground stake, thereby causing controllable movement of the tail-feathers. The result is life-like simulated full strut gobbler tail movement.

An alternative embodiment of the present invention comprises a modification to the construction design, including the use of lighter components utilizing arrow shafts, thereby resulting in a lighter and easier to carry decoy apparatus. This alternative embodiment has the same function and operating principles as found in the preferred embodiment.

The present invention may also be adapted to move an entire decoy. This is accomplished by removing the tail-feathers, and instead attaching any other decoy to the rod. The remaining assembly, preparation, and movement of this alternative embodiment is similar to that of the preferred embodiment.

The foregoing and other features of the method and apparatus of the present invention will be further apparent from the description which follows.

BRIEF DESCRIPTION OF THE DRAWINGS

Other important objects and features of the invention will be apparent from the following detailed description of the invention, taken in connection with the accompanying drawings in which:

FIG. 3 is an elevation view of a tail rod ground stake assembly, in accordance with the present invention.

FIG. 4 is an elevation view of an assembled tail rod and ground stake, partially cutaway, in accordance with the present invention.

FIG. 5 is a top view of the apparatus of FIG. 4 (excluding the tail-feather attachment member, tail-feathers, and pull line), showing its rotational movement of the pulling arm, in accordance with the present invention.

FIG. 6 is an elevation view of an optional guide stake, in accordance with the present invention.

FIG. 9 is an elevation view of an alternative embodiment of an optional guide stake, in accordance with the present invention.

FIG. 10. is a side perspective view of the turkey decoy apparatus adapted to move an entire decoy, partially cutaway, in accordance with the present invention.

DETAILED DESCRIPTION OF THE PREFERRED EMBODIMENTS

Figure 1:
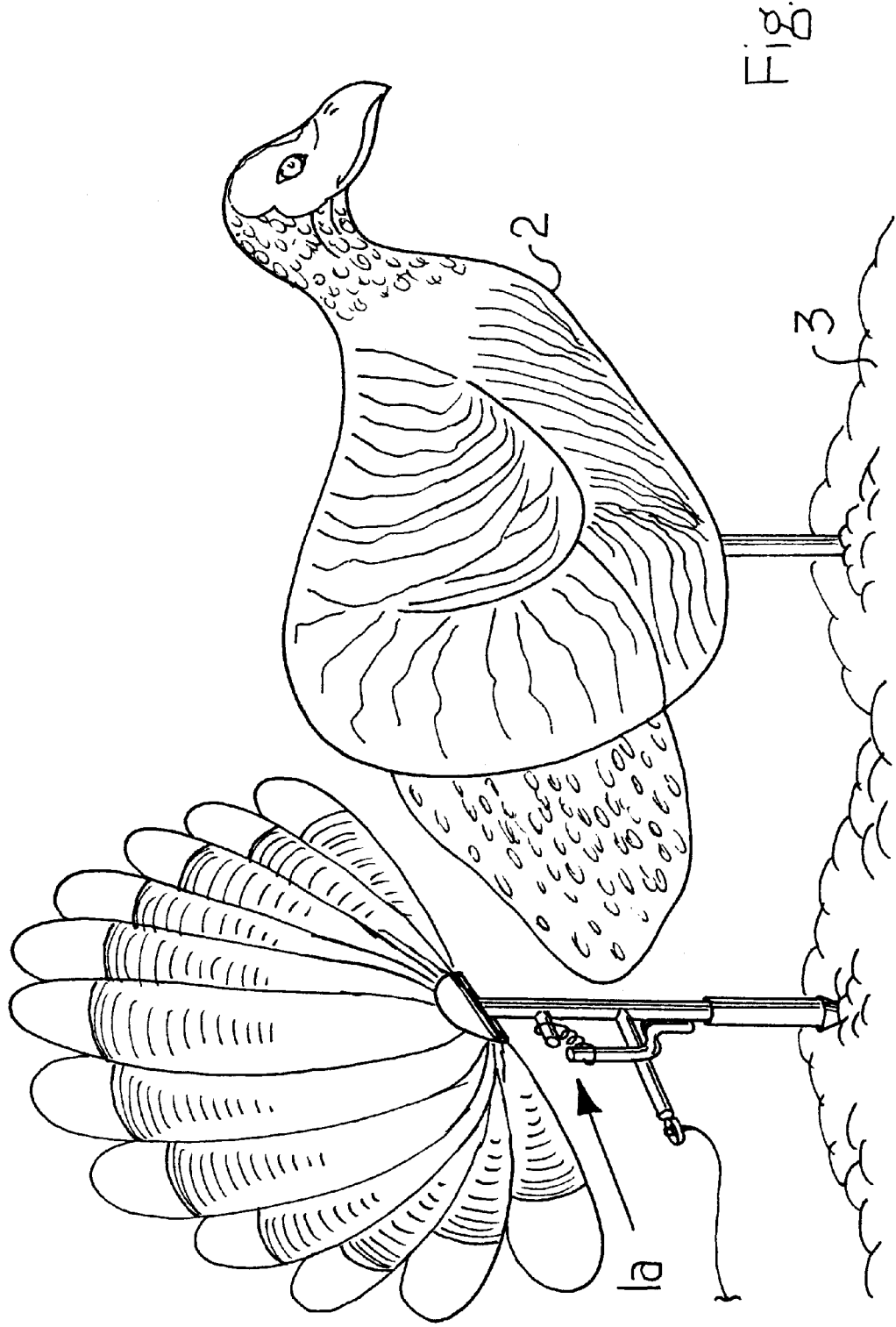
FIG. 1 is a side perspective view of a turkey decoy apparatus used in conjunction with a turkey decoy body, in accordance with the present invention.

Referring now to the drawings in detail, FIG. 1 shows a manually activated decoy apparatus. A turkey decoy body 2 is placed adjacent decoy apparatus 1a. Any turkey decoy may be adapted for use as the turkey decoy body 2, as long as there are no tail-feathers attached to the turkey decoy body 2. The decoy apparatus 1a and turkey decoy body 2 are both inserted into the ground 3, with the decoy apparatus 1a perpendicularly and centrally abutting the rear portion of the turkey decoy body 2.

Figure 2:
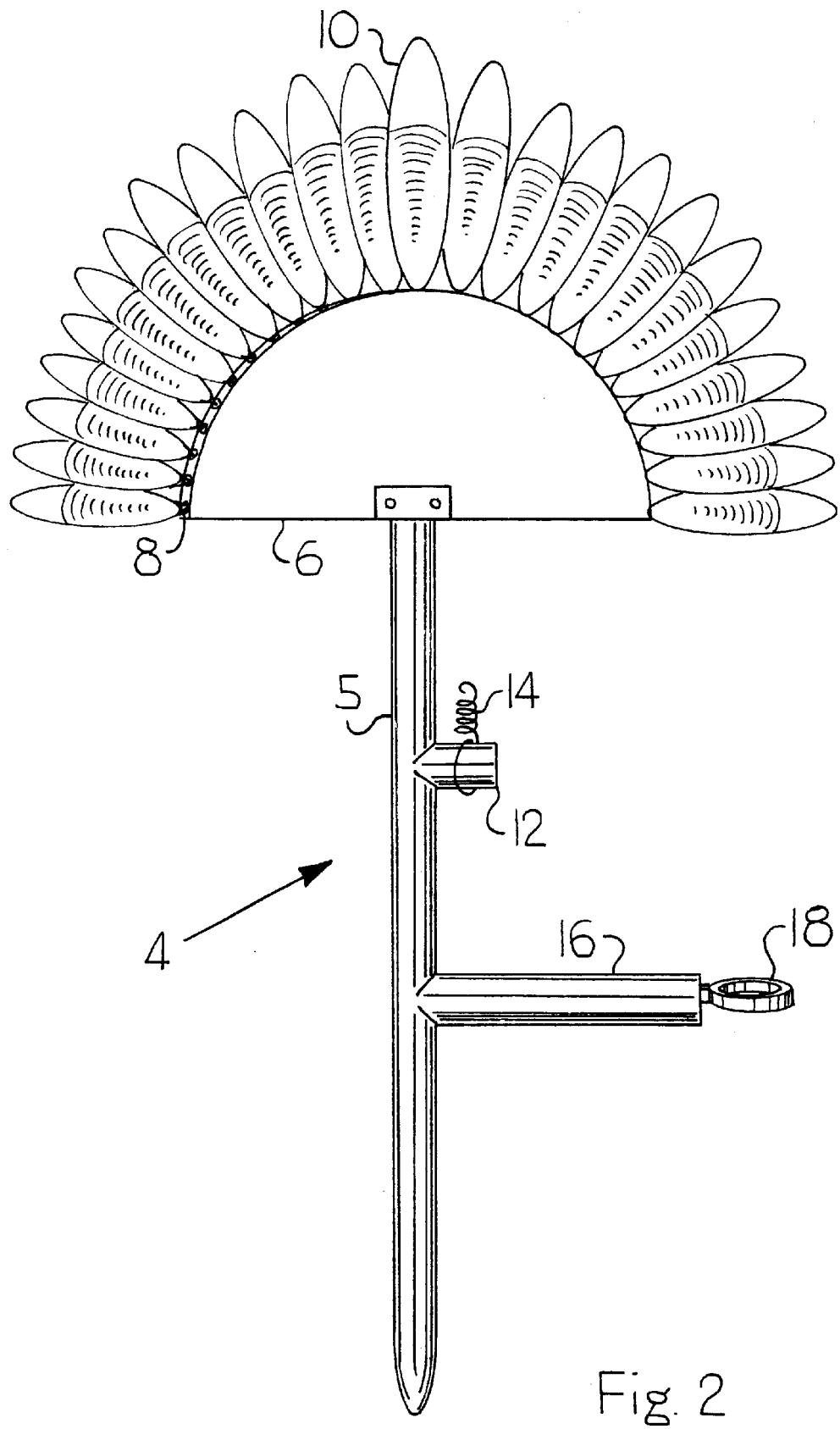
FIG. 2 is a rear elevation view of a tail rod assembly, in accordance with the present invention.

The decoy apparatus 1a is comprised of a tail rod assembly 4 and ground stake assembly 20, as depicted in FIGS. 2 and 3, respectively. The component parts of the present invention may be constructed from materials including, but not limited to, wood, plastic, aluminum, and steel, with the components being joined by various means, including, but not limited to welding, bolting, and gluing.

The tail rod assembly 4 is comprised of a tail rod 5, with one end of the tail rod 5 having a conical shape and the second end being attached to a tail-feather attachment member 6. The tail-feather attachment member 6 is crescent-shaped, having tail-feather holes 8, drilled within its outer curved edge. The depth, width, and placement of each tail-feather hole 8 is sufficient to accommodate a tail-feather 10, therein. It is preferable to use real gobbler tail-feathers, as they add detail to the decoy, and thereby draw turkeys to an even closer proximity, as compared to the use of artificial feathers.

Returning to the tail rod 5 depicted in FIG. 2, a first spring arm 12 is affixed to the tail rod 5 in a relatively central location in relation to the length of the tail rod 5. The first spring arm 12 is sufficient in length and diameter to removably accommodate a coil spring 14 thereon. Below and parallel to the first spring arm 12, a pulling arm 16 is affixed to the tail rod 5. A round washer 18 is horizontally affixed to the free end of the pulling arm 16.

With continuing reference to FIG. 1, FIG. 3 depicts a ground stake assembly 20, comprised of a solid round stock 21 inserted and fixed into a larger diameter hollow round stock 24. Affixed to the hollow round stock 24 is an upwardly extending second spring arm 26, extending past the top of the hollow round stock 24. A triangular tab 22 is affixed near the conically-shaped free end of the solid round stock 21 to prevent the ground stake assembly 20 from moving after having been inserted into the ground 3.

With continuing reference to FIGS. 1, 2, and 3, FIG. 4 illustrates an assembled turkey decoy apparatus 1a comprised of the tail rod assembly 4 and ground stake assembly 20. The conical-shaped end of the tail rod 5 of the tail rod assembly 4 is inserted into the hollow round stock 24 of the ground stake assembly 20. This results in the tail rod assembly 4 resting co-axially within the hollow round stock 24 and pivoting on the flat top surface of the solid round stock 21 of the ground stake assembly 20. Further assembly of the turkey decoy apparatus 1a requires the coil spring 14 that is removably attached to the first spring arm 12 of the tail rod 5 to be looped onto the second spring arm 26, extending from the hollow round stock 24. Additionally, a pull line 28, preferably a 20lb. test fishing line, is removably attached, preferably with a fishing snap swivel 29, to the washer 18 of the pulling arm 16.

With continuing reference to FIGS. 1, 2, 3, and 4, FIGS. 5, 6, and 7 illustrate the operation and environment of the preferred embodiment of the turkey decoy apparatus 1a. After the user has properly positioned the turkey decoy apparatus 1a and turkey decoy body 2 into the ground 3, as previously discussed and as depicted in FIG. 1., the user unravels the pull line 28 to a length that would allow him to maintain a hunting position that provides visibility of the decoy area and concealment from any potential prey. Upon assuming such a position, the user may pull on the pull line 28 to activate the turkey decoy apparatus 1a. The pulling action results in the tail rod assembly 4 to rotate upon its pivot point within the hollow round stock 24. Upon the commencement of this rotation, the coil spring 14 connecting the first spring arm 12 to the second spring arm 26, begins to elongate. The continuous tension created when the coil spring 14 elongates, accompanied by controlled pulls and releases on the pull line 28 by the user, provides for natural-in-effect, side-to-side movement of the tail-feathers 10. The turkey decoy apparatus 1a may therefore be manually manipulated in such a manner as to simulate a full strut, inherent to a gobbler's mating ritual. Turkeys observing such a tail movement will successfully and consistently be attracted to the immediate area in which the turkey decoy apparatus 1a is situated.

Due to the diverse topography of hunting grounds, a straight, clean line to the decoy apparatus 1a may not always be achieved, thereby requiring the pull line 28 to be guided around stationary environmental objects. This may result in the normal movement of the pull line 28 to be inhibited. For example, depending upon a user's position, a different angle may be required of the pull line 28 that may only be provided by the use of guide stakes, such as long guide stake 30 and short guide stake 32. Furthermore, if the pull line 28 abuts an object such as a tree, entanglement of the pull line 28 may occur, resulting in unnatural motion being translated to the tail-feathers 10. Consequently, such entanglement creates friction and abrasion, thereby weakening the strength of the pull line 28 and ultimately resulting in its tearing. Uneven terrain surfaces and elevations such as a hill may present similar problems. The aforementioned situations may create failure in the operation of the turkey decoy apparatus 1a at critical times. In reference to FIG. 6, to counter such effects, the user may utilize a long guide stake 30 to create angled approaches over and around obstacles. The short guide stake 32 may be utilized around the immediate area of the turkey decoy apparatus 1a, keeping the pull line 28 low to the ground 3, thereby preventing approaching turkeys from tripping on the pull line 28.

Referring to FIG. 6, the long guide stake 30 is comprised of a solid round stock 35. The long guide stake 30 has a round washer 34 vertically affixed to one end of the solid round stock 35. Preferably, the washer 34 has a split 36 in the middle portion of one of its sides, to insert the pull line 28. The pull line 28 should be kept taut to avoid disengaging from the washer 34. The short guide stake 32 is similar in construction to the long guide stake 30, except that the solid round stock 33 of the short guide stake 32 is shorter than the solid round stock 35 of the long guide stake 32.

Figure 7:
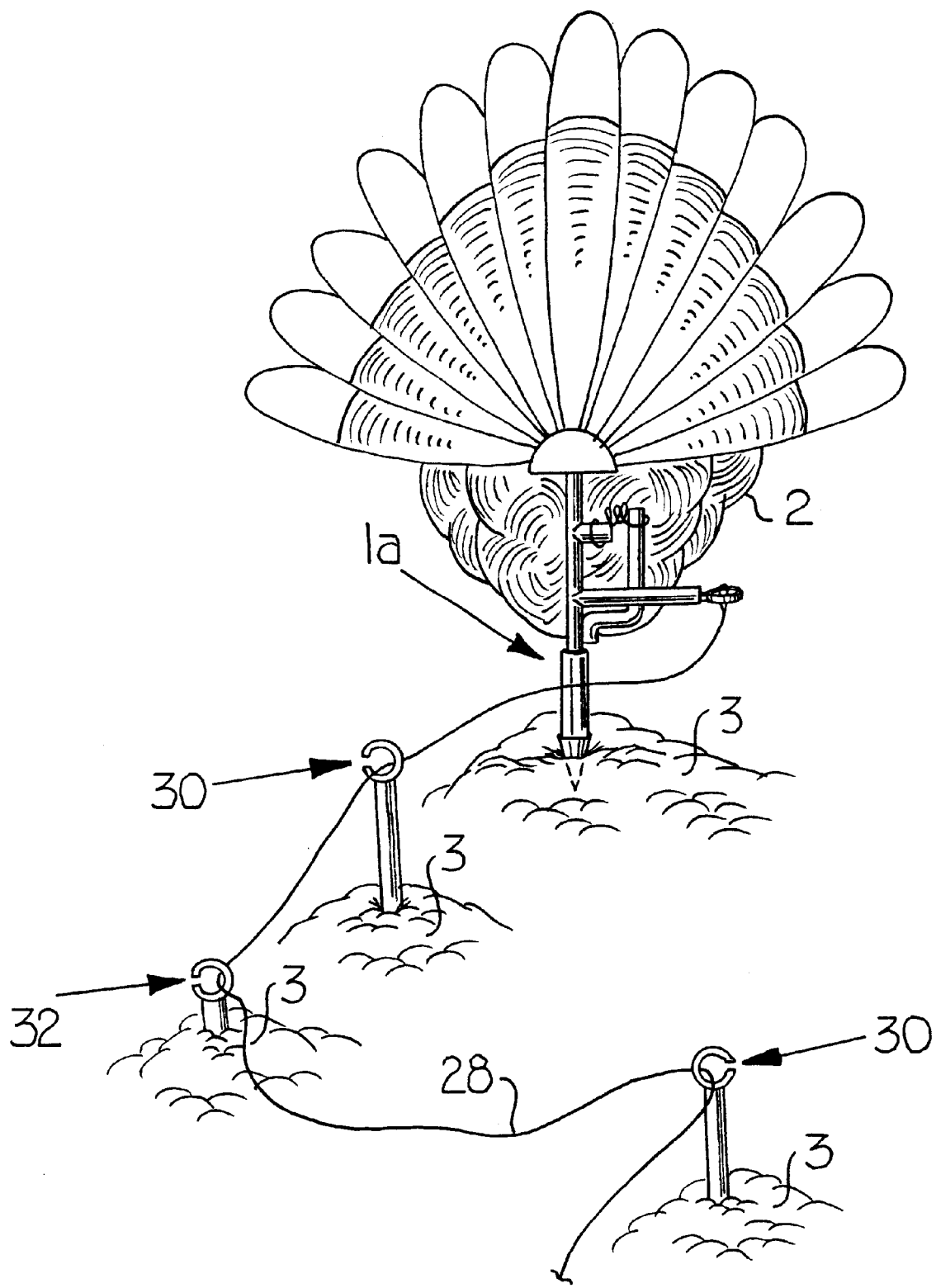
FIG. 7 is a rear view of a turkey decoy apparatus including guide stakes, used in conjunction with a turkey decoy body, in accordance with the present invention.

FIG. 7 shows how both the long guide stake 30 and the short guide stake 32 may be optionally implemented in the use of the turkey decoy apparatus 1a, by inserting the aforementioned stakes into the ground 3 and routing the pull line 28 through the washer 34 of each guide stake. In order to maintain the fullest range of movement of the tail-feathers 10, it is preferred that the guide stake closest to the turkey decoy apparatus 1a be situated at a 45° angle in relation to the rear of the turkey decoy apparatus 1a. The user may operate the turkey decoy apparatus regardless of whether he uses the long guide stake 30, short guide stake 32, a combination of both types of stakes, or no guide stakes at all.

With continuing reference to FIGS. 1–7, FIG. 8 shows an alternative embodiment of turkey decoy apparatus 1a that comprises a modification to the construction design, including, but not limited to the use of lighter components. The operation and environmental setting of the alternative embodiment turkey decoy apparatus 1b, is the same as that of the preferred embodiment turkey decoy apparatus 1a, as depicted in FIG. 5 and FIG. 7.

Similar to the turkey decoy apparatus 1a, the alternative embodiment turkey decoy apparatus 1b is comprised of a tail shaft assembly 38 and ground shaft assembly 40, the shafts, preferably being camouflaged arrow shafts. The tail shaft assembly 38 is comprised of a tail shaft 39, with one end of the tail shaft 39 having a target point 54 and the second end having a first threaded bushing 42a. A tail-feather attachment member 7a, is affixed on one end of a tail-feather attachment member shaft 37a and a second threaded bushing 42b, adapted to receive the first threaded bushing 42a, is affixed to the other end of the tail-feather attachment member shaft 37a.

The tail shaft 39 is further comprised of a dowel 44, preferably hardwood, secured within the tail shaft 39. A side section of the tail shaft 39 and a side section of dowel 44 are slotted in the same location in relation to each other, thereby creating a slot 51a to vertically accommodate a pulling arm 52 recessed therein. One end of the pulling arm 52 is bent in such a manner as to line the inside of the slot 51a and to abut along the outside of the tail shaft 39. This portion of the pulling arm 52 is secured to the tail shaft 39 using heat-shrink tubing 46. The free end of the pulling arm 52 extends horizontally in relation to and away from the tail shaft 39, assuming the shape of a loop 53 at its distal end. An eye bolt 48 is threadably engaged horizontally through the tail shaft 39 and into the dowel 44. The eye bolt 48 is sufficient in length and diameter to removably accommodate the coil spring 14 thereon.

The ground shaft assembly 40 is comprised of a ground shaft 41, with one end of the ground shaft 41 having a flared and flattened target point 56, and the second end being inserted and fixed into a larger diameter ground shaft 47. The ground shaft 41 is further comprised of a dowel 45, preferably hardwood, secured in the upper portion of the ground shaft 41. A side section of the ground shaft 41, a side section of the larger diameter ground shaft 47, and a side section of dowel 45 are slotted in the same location in relation to each other, thereby creating a slot 51b to vertically accommodate a spring arm 50 recessed therein. One end of the spring arm 50 is bent in such a manner as to line the inside of the slot 51b and to abut along the outside of the ground shaft 41. This portion of the spring arm 50 is secured to the ground shaft 41 using heat-shrink tubing 46. The free end of the spring arm 50 upwardly extends, parallel to the ground shaft 41 and past the top of the larger diameter ground shaft 47. The flared and flattened target point 56 prevents the ground shaft assembly 40 from moving after having been inserted into the ground 3.

Assembly of the alternative embodiment turkey decoy apparatus 1b, requires inserting the tail shaft assembly 38 into the larger diameter ground shaft 47 of the ground shaft assembly 40. This results in the tail shaft assembly 38 resting co-axially within the larger diameter ground shaft 47 and pivoting on the flat top surface of the dowel 45 of the ground shaft assembly 40. Further assembly of the alternative embodiment turkey decoy apparatus 1b requires the coil spring 14 that is removably attached to the eye bolt 48 of the tail shaft 39 to be looped onto the spring arm 50. Additionally, the pull line 28 is removably attached, preferably with the fishing snap swivel 29, to the loop 53 of the pulling arm 52.

Referring to FIG. 9, the alternative embodiment turkey decoy apparatus 1b is also comprised of one or more guide stakes 60 of varying length. Although guide stake 60 varies in construction and material in that it is comprised of an arrow shaft 62, with a target point 68 on one end of the arrow shaft 62, and a dowel 64, preferably hardwood, secured in the upper portion of the arrow shaft 62. Additionally, an eye bolt 66 is threadably engaged vertically into the top of the exposed dowel 64 of the arrow shaft 62. Different lengths of guide stake 60 may perform the same function and operate in the same environment as the long guide stake 30 and short guide stake 32 depicted in FIG. 6.

Figure 8:
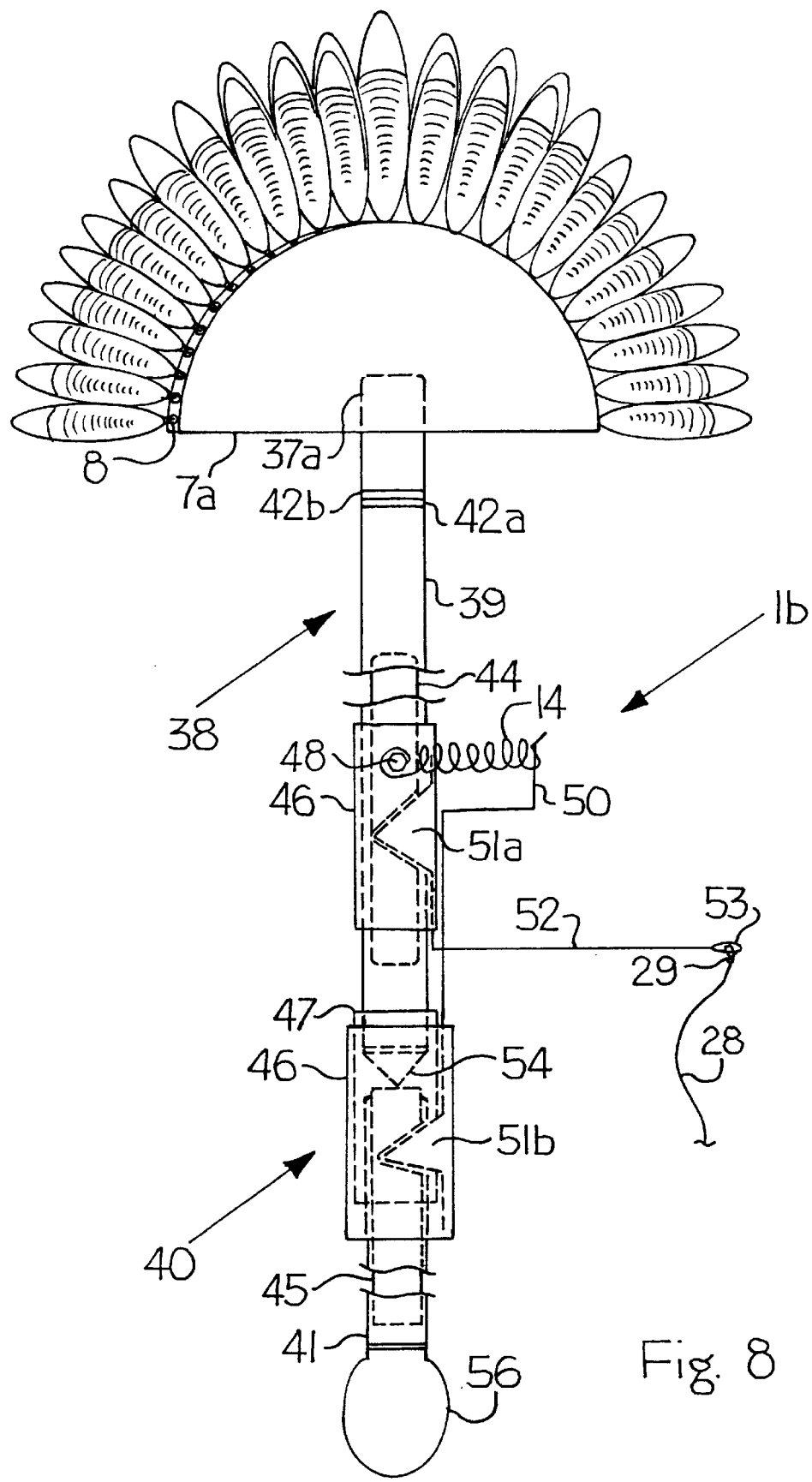
FIG. 8 is an elevation view of an alternative embodiment of the turkey decoy apparatus, comprising a modified construction design and lighter components, in accordance with the present invention.

With continuing reference to FIG. 8, FIG. 10 depicts an additional feature of the alternative embodiment turkey decoy apparatus 1b. The alternative embodiment turkey decoy apparatus 1b may be easily adapted to accept and to move an entire decoy 71. This is accomplished by constructing a decoy assembly 70 consisting of a decoy 71, preferably a collapsible decoy with a bottom slot 72, and a second tail-feather attachment member 7b. Prior to inserting the second tail-feather attachment member 7b into the bottom slot 72 of the decoy 71, a sufficient number of support rods 73, preferably dowels, are fitted into the tail-feather holes 8 of the second tail-feather attachment member 7b, to provide support and stability for the decoy 71. This construction allows the user to utilize both a tail shaft assembly 38 comprising tail-feathers 10 and also a decoy assembly 70 while hunting. When the user deems it necessary, the decoy assembly 70 may be substituted for the tail feathers 10. The user first removes the tail-feather attachment member 7a by threadably unengaging the tail-feather attachment member shaft 37a from the tail shaft 39 via the threaded bushings 42a and 42b. The user then threadably engages the decoy attachment member shaft 37b of the decoy assembly 70 onto the tail shaft 39, thereby having the decoy assembly 70 become part of the tail shaft assembly 38. The manner of operation for moving the decoy 71 is identical to the manner of operation for moving the alternative embodiment turkey decoy apparatus 1b, as discussed above, with the exception, that instead of the tail-feathers 10 being manually and controllably moved, the entire decoy 71 achieves such an effect.

From the foregoing detailed description of the illustrative embodiment of the invention set forth herein, it will be apparent that there has been provided a new, useful, and uncomplicated decoy apparatus, which through controllable manual motion, produces a natural-in-effect, isolated tail-feather movement, thereby simulating a gobbler's full strut. The invention requires only a minimal number of elements, utilizes real turkey feathers, is quiet and requires no electrical power source, requires only a minimal number of steps to utilize, allows uninhibited control through unlimited guide stake configurations, may be used in a wide range of weather conditions, and allows for adaptation for moving an entire decoy.

The above invention has been described with reference to preferred and alternative embodiments. Obvious modifications, combinations, and alterations will occur to others upon reading the preceding detailed description. It is intended that the invention be construed as including all such modifications and alterations insofar as they come within the scope of the appended claims or the equivalents thereof.

I claim:

1. A manually controlled turkey decoy apparatus adapted for imitation of the mating behavior of a turkey, said apparatus comprising:
   a visual representation of feathers;
   a connection for attaching the visual representation of feathers to a tail-feather attachment member, wherein the visual representation of feathers includes turkey tail-feathers attached to the tail-feather attachment member in a turkey tail-feather configuration;
   a tail rod connected to the tail-feather attachment member;
   a pulling arm affixed to the tail rod, the pulling arm having a pull line;
   a ground stake that is adapted to co-axially and rotatably accept the tail rod; and
   a coil spring extending between the tail rod and the ground stake.

2. The apparatus of claim 1, further comprising a tail rod having an upper end and a lower end, the upper end of the tail rod being perpendicularly connected to the tail-feather attachment member, and the lower end of the tail rod having a pivot point.

3. The apparatus of claim 2, further comprising a pulling arm having a near end and a distal end, the near end being perpendicularly affixed to the tail rod, and the distal end having a means of attaching the pull line.

4. The apparatus of claim 1, wherein the ground stake has a first end and a second end, the first end being shaped to allow for insertion into the ground, and the second end comprising a tubing of sufficient diameter to coaxially receive the tail rod slidingly therein, the tubing rotatably connecting and limiting the depth of insertion of the tail rod.

5. The apparatus of claim 1, further comprising:
   a first spring arm perpendicularly attached to the tail rod, the coil spring being connected to the first spring arm; and
   a second spring arm upwardly extending from the ground stake, able to receive the coil spring from the first spring arm.

6. The apparatus of claim 5, wherein the coil spring connects the first spring arm to the second spring arm.

7. The apparatus of claim 1, further comprising a guide stake having a first end and a second end, the first end adapted to allow for insertion into the ground, and the second end adapted to receive and secure the pull line.

8. The apparatus of claim 1, wherein the tail rod may rotate within the ground stake assembly.

9. The apparatus of claim 1, further comprising a decoy, wherein the decoy apparatus may be adapted to support the decoy in its entirety.

10. The apparatus of claim 9, wherein the decoy has an open bottom, a hole of the tail-feather attachment member accommodates a rod, and the rod of the tail-feather attachment member internally supports the decoy.

11. A method for using a decoy to imitate the mating behavior of a turkey comprising the steps of:
    providing a decoy apparatus;
    providing a turkey decoy body;
    positioning the decoy apparatus proximate to the turkey decoy body;
    inserting a ground stake assembly into the ground;
    inserting a tail rod assembly into the ground stake assembly;
    attaching a pull line to a pulling arm of the tail rod assembly; and
    rotating the tail rod assembly within the ground stake assembly, the ground stake assembly being perpendicular to the ground.

12. The method of claim 11 wherein the turkey decoy body has a front end and a rear end, and the method further comprises inserting the turkey decoy body into the ground, the rear end being adjacent to the decoy apparatus.

13. The method of claim 11 further comprising the step of connecting a coil spring from the tail rod assembly to the ground stake assembly.

14. The method of claim 11 further comprising a guide stake, inserting the guide stake into the ground, and securing a pull line within the guide stake.

15. The method of claim 14, further comprising the step of inserting the guide stake into the ground to impose varying angles and elevations on the pull line.

16. The method of claim 11, whereby a pulling action of a pull line causes the tail rod to rotate, the tail rod thereby exerting tension on a coil spring, the tension causing the tail rod to return to its original-position upon controlled release of the pull line, the pulling action being able to be repeated as to simulate a side-to-side motion of a full strut of a turkey.

17. The method of claim 11, further comprising a decoy, and re-configuring the tail-feather attachment member to accommodate the decoy.

18. The method of claim 17, whereby a pulling action of a pull line causes the tail rod to rotate, the tail rod thereby exerting tension on a coil spring, the tension causing the tail rod to return to its original position upon controlled release of the pull line, the pulling action causing the decoy to rotate back and forth.

* * * * *

UNITED STATES PATENT AND TRADEMARK OFFICE
CERTIFICATE OF CORRECTION

PATENT NO.    : 6,487,810 B1                                          Page 1 of 1
DATED         : December 3, 2002
INVENTOR(S)   : Van Loughman It is certified that error appears in the above-identified patent and that said Letters Patent is hereby corrected as shown below:

Column 1,
Line 21, "Samnara" should read -- Samaras --.
Line 44, "is-meant" should read -- is meant --.
Line 56, "disclosed." should read -- disclosed --.

Column 2,
Line 40, "fill operability" should read -- full operability --.

Column 9,
Line 2, "original-position" should read -- original position--.

Signed and Sealed this

Eighth Day of April, 2003

JAMES E. ROGAN
*Director of the United States Patent and Trademark Office*